July 22, 1969  R. NOACK  3,456,569
PHOTOGRAPHIC CAMERA WITH ELECTROMAGNETICALLY CONTROLLED SHUTTER
Filed Jan. 9, 1967  3 Sheets-Sheet 1

INVENTOR
ROLF NOACK
By Young & Thompson
Attys.

July 22, 1969 R. NOACK 3,456,569
PHOTOGRAPHIC CAMERA WITH ELECTROMAGNETICALLY CONTROLLED SHUTTER
Filed Jan. 9, 1967 3 Sheets-Sheet 2

INVENTOR
ROLF NOACK
By Young & Thompson
ATTYS.

July 22, 1969   R. NOACK   3,456,569
PHOTOGRAPHIC CAMERA WITH ELECTROMAGNETICALLY CONTROLLED SHUTTER
Filed Jan. 9, 1967   3 Sheets-Sheet 3

INVENTOR
ROLF NOACK
By Young & Thompson
ATTYS.

United States Patent Office 3,456,569
Patented July 22, 1969

3,456,569
PHOTOGRAPHIC CAMERA WITH ELECTRO-
MAGNETICALLY CONTROLLED SHUTTER
Rolf Noack, Dresden, Germany, assignor to VEB Penta-
con Dresden Kamera- und Kinowerke, Dresden,
Germany
Filed Jan. 9, 1967, Ser. No. 608,055
Int. Cl. G03b 9/14
U.S. Cl. 95—63                     5 Claims

ABSTRACT OF THE DISCLOSURE

This device relates to a shutter mechanism in a camera. The shutter drive member runs down in one direction which both opens and closes the shutter blades. When the shutter blades are open the shutter is stopped by a blocking lever. The shutters are held open until released by an electronic timing device conjoined with an electromagnet. When released the spring loaded shutter closes.

---

The invention relates to a photographic camera having a shutter the drive member of which, which runs off in one direction for the execution of the operations of opening and closing the shutter blades, after travelling the opening stroke is haltable by a blocking lever, releasable by an electronic timing device by means of a magnet, for the closing stroke.

Known shutters having timing device of this kind possess separate opening and closing mechanisms, which make the shutter assembly complicated. A shutter has also become known in which the drive member which causes the shutter blades to open and close the light-passage aperture is halted by the armature of a holding magnet after travelling its opening stroke. Apart from the fact that this requires an especially strong magnet system for the holding of an armature which is directly subject to the action of the shutter-drive spring, this arrangement involves the danger that the inertia moment of the impacting drive member might tear the armature loose from the holding magnet. This disadvantage can also be inadequately removed by a known blocking pawl formed as armature, because for the overcoming, necessary in the release of the pawl, of the friction occurring between pawl and drive member, which friction is determined by the strong drive spring and increases as a result of the danger of knocking in of the pawl by the blocking dog of the drive member, a relatively strong break-away spring for the pawl is necessary; its force must be reliably overcome by the magnet system by holding or attraction. Apart from the large-dimensioned construction style, a great energy consumption occurs, above all in the case of long and B exposures, which results in rapid exhaustion of the installed batteries.

The present invention has the purpose of avoiding the above disadvantages by an economic utilization of the energy stores insertable into the camera. The invention is based upon the problem of providing a functionally reliable and expense-saving electromagnetic release device for the drive member which is to be halted after the carrying out of the opening operation.

According to the invention this is achieved due to the fact that there are provided a blocking lever, which follows the cocking lever of the shutter into the position blocking the drive member as a result of spring force, and a striker lever which pivots the blocking lever against its blocking spring as a result of a striker spring, while until the switching on of the electromagnetic holding device for the striker lever the latter can be held fast against its striker spring by the return spring of the camera release. This measure possesses the advantage that even a strong holding spring for the pawl is reliably releasable using the kinetic energy of the striker lever which is loaded with a relatively weak striker spring and therefore can be held fast by a magnet system of small dimensions. With the camera release there is preferably coupled, through a holding spring, a holding lever which on actuation of the camera release is pivotable by the engaging member thereof, after the switching on of the electromagnetic holding device for the striker lever, out of the running off path of the latter. According to one particular embodiment the striker lever carries an armature which the holding lever coupled with the camera release seeks to lay against a holding magnet controlled by the electric timing device with a view to a sudden field variation. If a pulling magnet of small dimensions is used, the striker lever is advantageously bringable into engagement against its striker spring with the armature lever of a pulling magnet, by the camera release returning into its rest position, through the holding lever coupled therewith. The release device according to the invention can be utilized expediently in the case of what are called self-cocking shutters, in that the camera release rotates the cocking lever through a cocking arm before the electromagnetic holding device for the striker lever is switched on, the cocking lever being automatically uncouplable in a manner known per se from the drive member of the shutter towards the end of its cocking travel. B exposures are carried out according to the invention by blocking of the striker lever according to choice. The details of the new release device may be seen from an illustrated and described example of embodiment.

Figure 1:
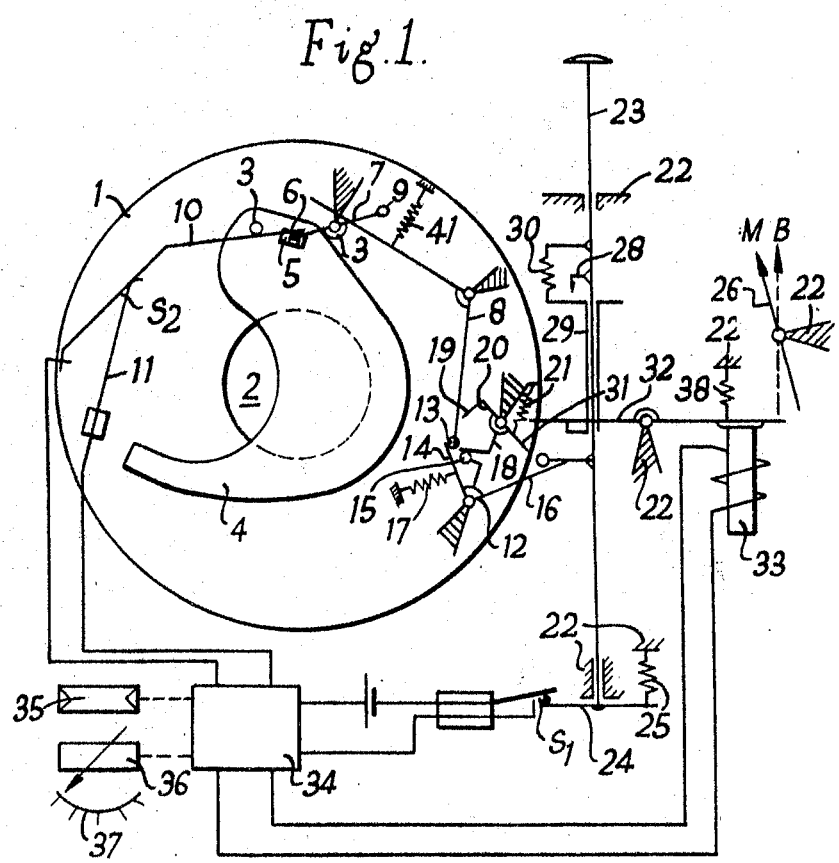
FIGURE 1 shows the shutter according to the invention in the rest position.

In the housing 1 (see FIGURE 1) provided with a light-passage aperture 2, blades 4, of which only one is illustrated for the sake of clarity, are rotatably mounted on bearing pins 3. Through the drive slots 5 of the blades 4 there extends the driver pin 6, bevelled off towards the light-passage aperture 2, of the blade lever 7, which also carries a closer pin 9. In the range of swing of the driver pin 6 there is arranged the flexible contact spring 10, which together with the stationary contact arm 11 forms the control switch $S_2$. The driver lever 8 is subject to the action of the driver spring 41 and has a blocking pin 13 bevelled off on the side remote from the light-passage aperture 2. The cocking lever 12 is subject to the action of the tension spring 17 and possesses a cocking arm 14, a release arm 15 and an actuating arm 16. The release arm 15 is in engagement with the pivot arm 18 of the blocking lever 20 carrying the blocking pawl 19; the blocking spring 21 seeks to lay the blocking pawl 19 into the running-off path of the blocking pin 13.

The camera release 23, which is slidably mounted in the only partially represented camera housing 22, is subject to the action of a return spring 25 and possesses a switch dog 24 which holds the operating switch $S_1$ open when the camera release 23 is in the rest position. Moreover the camera release 23 possesses a cocking dog 27 and an engaging member 28. On the camera release 23 there is axially movably mounted a holding slider 29 which is coupled with the camera release 23 through a holding spring 30. The holding spring 30 seeks, through the holding lever 29, to lay a rotatably mounted striker lever 32, which is arranged in the path of the pivot arm 31 of the cocking lever 20, against the holding magnet 33 or the engaging member 28, against the action of the striker spring 38. The holding magnet 33 is switched off by a known electronic timing device 34, the time moment of this switching action being determined according to choice by a photo-conductive cell 35 or a manually settable regulating resistor 36, according to the measure of an exposure-time scale 37.

By means of a change-over switch 26 settable to the marks M (instantaneous exposure) and B exposure, the striker lever 32 can be blocked according to choice against its striker spring 38.

The manner of operation is as follows:

On depression of the camera release 23 against the return spring 25 the operating switch $S_1$ is closed by the switch dog 24, whereby the holding magnet 33 is energized and pulls up the striker lever 32. On further depression the engaging member 28 strikes upon the holding lever 29 and pushes it out of the running-off path of the striker lever 32.

Figure 2:
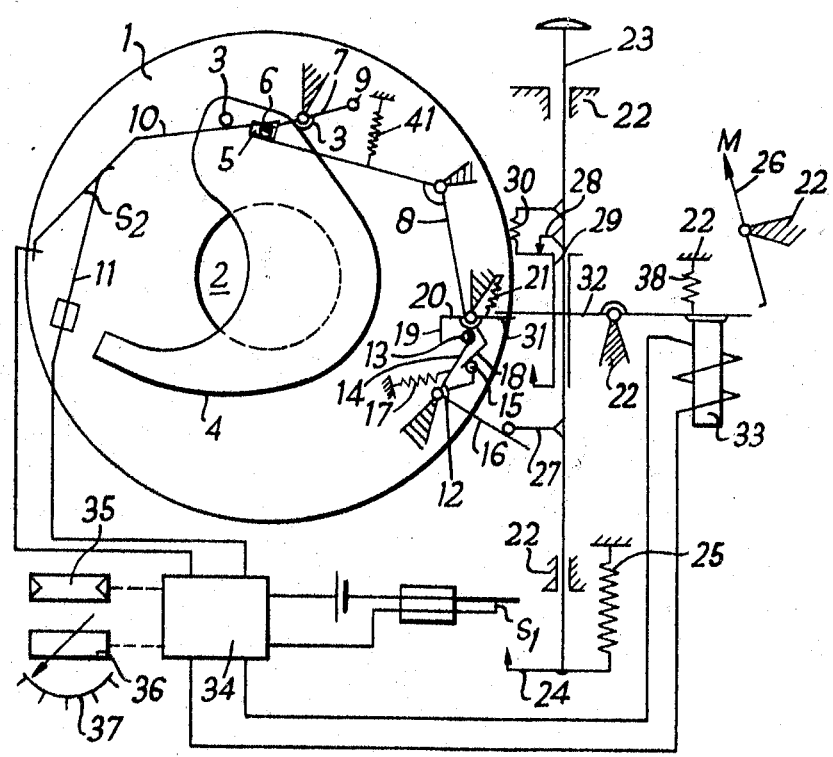
FIGURE 2 shows the shutter mechanism in the cocked position.

Thereafter the cocking dog 27 strikes upon the operating arm 16 of the cocking lever 12 and rotates the latter in the clockwise direction against the tension spring 17. Here the cocking arm 14, through the blocking pin 13, entrains the driver lever 8 against the driver spring 41 in the counter-clockwise direction, the driver lever sliding over the bevelled-off driver pin 6 and placing itself before it. At the same time the pivot arm 18 of the blocking lever 20 runs behind the release arm 15 of the cocking lever 12, so that the pawl 19 drops behind the blocking pin 13 (see FIGURE 2).

On further depression of the camera release 23 the cocking arm 14 slips off from the blocking pin 13, so that the energy of the tensioned driver spring 41 becomes free and rotates the driver lever 8 in the clockwise direction. Through the driver pin 6 the blade lever 7 is here moved in the counter-clockwise direction, the blades 4 rotating about the bearing pins 3 into the open position (see FIGURE 3) and the control switch $S_2$ being opened by actuation of the contact spring 10. In the open position of the blades 4 the driver lever 10 is halted by the blocking lever 20 shortly before it leaves the driver pin 6, in that the pawl 19 catches the blocking pin 13.

Figure 3:
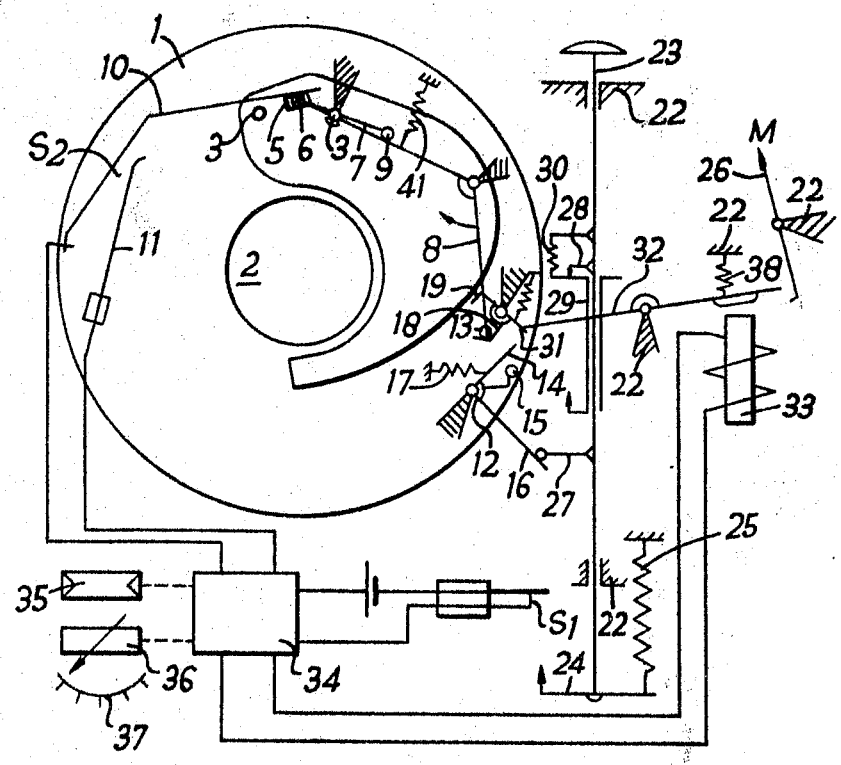
FIGURE 3 shows the shutter mechanism in the open position in the initiation of the closing operation.

After the time interval determined by the electronic timing device 34, the holding magnet 33 is deenergized, so that the striker spring 38 can rotate the striker lever 32 in the counter-clockwise direction (see FIGURE 3). The striker lever 32 strikes upon the pivot arm 31 of the blocking lever 20 and releases the pawl 19 from the blocking pin 13, so that the driver lever 8 can continue its running-off movement as a result of the driver spring 41. Firstly the driver lever 8 leaves the driver pin 6 and then strikes upon the closer pin 9 of the blade lever 7, which consequently is rotated in the counter-clockwise direction. The blades 4 then come into the closed position again.

On relaxation of the release pressure upon the camera release 23 the latter returns into its rest position as a result of the return spring 25, while through the holding lever 29 the striker lever 32 is laid against the holding magnet 33, against the action of the striker spring 38, the cocking lever 12 swings as a result of the tension spring 17 with its cocking arm 14 away over the oblique face of the blocking pin 13 and into its rest position, and the operating switch $S_1$ is opened again.

If before depression of the camera release 23 the change-over switch 26 is set to the mark B (B exposures), then the striker lever 32 is blocked. On depression of the camera release 29 the electronic timing device is switched on again, so that after the formed time interval the holding magnet 33 is deenergised. The striker spring 38 cannot however rotate the blocking lever 32 which is blocked by the change-over switch 26. Only on relaxation of the release pressure does the release lever 12 follow the cocking dog 27 under the action of the tension spring 17. Then the release arm 15 of the cocking lever 12, through the pivot arm 18, rotates the blocking lever 20 into the rest position; here the pawl 19 is disengaged from the blocking pin 13. In the case of the B setting of the change-over switch 26 thus the shutter remains open as long as the camera release 23 remains pressed in.

Figure 4:
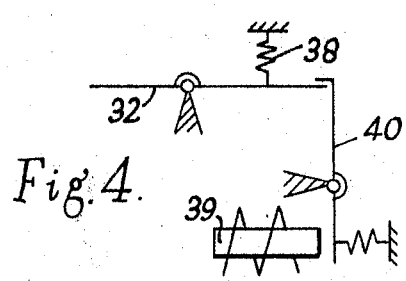
FIGURE 4 shows the arrangement of a pulling magnet.

The device according to the invention is also suitable for the use of a pulling magnet 39 of low power (FIGURE 4). In the case of this embodiment the striker lever 32 is held against its striker spring 38 by an armature lever 40. After the time interval determined by the electronic timing device 34 the pulling magnet 39 is energised and pulls up the armature lever 40, so that the striker lever 32 is liberated.

I claim:

1. A photographic camera having a shutter, a drive member for opening and closing the blades of the shutter by running down in one direction, a cocking lever for moving the drive member to the position from which it runs down, which cocking lever pivots upon actuation of the camera release, a blocking lever which by means of a spring pivots, when the cocking lever pivots, into a position blocking the drive member in a position in which the shutter blades are in their open position, a striker lever normally spaced from the blocking lever, a spring for pivoting the striker lever into a position in which it moves the blocking lever out of its blocking position, and an electromagnetic device for holding the striker lever against the bias of its spring and releasing the striker lever after a period of time determined by a timing device.

2. A photographic camera as claimed in claim 1 wherein there is provided a holding lever resiliently coupled to the camera release by means of a spring, which holding lever holds the striker lever in engagement with the electromagnetic holding device when the camera release is in its rest position, the holding lever being moved upon actuation of the camera release out of the path of movement of the striker lever.

3. A photographic camera as claimed in claim 1, wherein the electromagnetic device comprises an electromagnet controlled by the timing device, which magnet attracts the striker lever on actuation of the camera release until it is switched off by the timing device whereupon the striker lever can pivot to move the blocking lever out of its blocking position.

4. A photographic camera as claimed in claim 1, wherein the electromagnetic device comprises an electromagnet controlled by the timing device and an armature lever for engaging the striker lever, whereby when the magnet is switched on by the timing device after a determined time interval it attracts the armature lever which released the striker lever.

5. A photographic camera as claimed in claim 1 wherein there is provided a change-over switch which can be moved into a position in which it holds the striker lever against the bias of its spring for B exposures.

References Cited

FOREIGN PATENTS 1,217,202  5/1966  Germany.
1,080,120  8/1967  Great Britain.

NORTON ANSHER, Primary Examiner

DAVID B. WEBSTER, Assistant Examiner

U.S. Cl. X.R.

95—53